United States Patent Office 2,971,849
Patented Feb. 14, 1961

2,971,849

COATING FOODS AND COMPOSITION THEREFOR

Havard L. Keil, Clarendon Hills, Ill., assignor to Armour and Company, Chicago, Ill., a corporation of Illinois No Drawing. Filed Oct. 7, 1957, Ser. No. 688,410

20 Claims. (Cl. 99—166)

The present invention relates to the protection and preservation of foods. More particularly, it deals with a coating for foods, the manufacture of the coating and the packaging of foods therein.

The food industry is continually seeking to improve the packaging procedures employed. Each producer is desirous of making his product more attractive and desirable to purchasers. The growth of self-service marketing has given tremendous impetus towards this end for the housewife sees and compares competitive products as selections are made. Not only is it desirable to have an attractive appearing package but, since the housewife wishes to actually view the product she is considering purchasing, the demand is for packages that are transparent. With some products, packages may be readily formed from transparent films to adequately solve the problem. Unfortunately, the solution is not that simple with all food products.

Those food products that incorporate substantial amounts of fats and oils present particular difficulties. If the fats or oils smear the inner side of the wrapper, the transparency and attractive appearance of the packaging material will be impaired. Some films or film forming materials are actually damaged by the presence of fats or oils. The grease may bleed through to the outer surface of the film. Where a film is to be sealed in the formation of the package, e.g. heat sealing in the manufacture of vacuum packages, care must be taken not to get any fat or oil on the areas in which the seal is to be made or it will cause great difficulty in the production of a satisfactory bond. Special precautions may have to be observed in the application of many films and film forming materials with an attendant increase in the cost of manufacture. These problems are encountered with numerous food items, for example, meats, cheese, oleomargarine, etc. Because of toxicity problems, etc., some films or film forming materials must not be brought into contact with foods and means must be provided for their separation if they are to be used in packaging foods.

The principal object of my invention is to provide a coating for such foods which will act as a grease barrier and produce a food having no grease on the outer surface thereof. The coating I have devised for foodstuffs may be used as the complete packaging material. It will inhibit molding and oxidation and offer protection against the salt rust condition often encountered in the manufacture of dry sausage items. It will give physical protection to the product against damage such as from rough handling. One of its most important advantages is its transparency. One can see clearly just what is inside the coating film. A label may be put on the product before it is coated and the label can be read without the slightest difficulty after the food and label have been coated. If a colored transparent film is desired, this often may be achieved, depending on the color desired, by a choice of coating material rather than resorting to the necessity of adding coloring to the film forming material. Another advantage is the speed with which the coating gels to form a non-tacky covering. This coating is also readily strippable from the product.

While the coating material I have devised has application for use alone as a packing material, it also has tremendous advantage for use as a precoating for products to be packaged in conventional films or film forming materials. Many of the well known films or film forming materials have water and/or water vapor barrier properties (both being referred to by the term water barrier properties), which are not substantially present in my film. Yet, as previously mentioned such films may be troubled by the presence of fats or oils. By first applying the coating material I have devised those fats and oils are sealed in so that they present no further problem. A conventional water impermeable film may be applied over my film with no further difficulty whatsoever. There will be no smearing of the outer film and the transparency of the finished package is determined almost completely by the transparency of the material used for the outer film. No sealing problems are encountered with the outer film. Film forming materials can be deposited over my film without special preparations. The complete package of the grease impermeable film over the product and the water impermeable film on the outside gives all the properties and protection that have been so long sought in the industry, and at a relatively low cost.

In the process I have devised the food stuff is dipped, cascaded or brushed with a liquid gelatinate of a metal selected from the group consisting of aluminum and non-toxic heavy metals with the coating thus applied being dried after the food is enrobed therein. This coating will dry rapidly at room temperature to leave a non-tacky surface. The finished coating is transparent, relatively tough and seals in any fat or oil in or on the foodstuff.

The metal gelatinate is prepared by introducing a salt of the metal into an aqueous gelatin solution. The metal reacts with the protein of the gelatin to form a complex termed a gelatinate. Since the coating is to be employed on foods, the metal used should be non-toxic. Any acid salt of the metal may be employed. While substantially any grade of gelatin can be used, e.g. 80 to 275 Bloom, we prefer to use a high grade gelatin, e.g. 275 Bloom, because the larger molecules give a tougher coating. No heat is required for the reaction, but the temperature should be above that at which the gelatin will gel. After the reaction is complete, which is substantially instantaneous, the food may be dipped in the resultant liquid gelatinate. The amount of the metal gelatinate in the dip will be determined primarily by the thickness of the coating to be applied. An excellent coating is obtained by using a solution of 20% solids. The preferable range of solids in the solution is between about 5% solids and about 30% solids by weight.

Another procedure for forming the gelatinate coating involves a two step coating process. The food to be coated is first dipped in a gelatin solution to form a gelatin coating on the food and thereafter is dipped in a solution of a salt of a metal selected from the group consisting of aluminum and non-toxic heavy metals. The metal will react with the gelatin of the coating produced by the first dipping step to produce a gelatinate coating. The amount of the depth of the gelatin coating that will be converted to a gelatinate will depend on the extent to which the gelatin coating has dried before dipping in the salt solution, the concentration of the salt solution, the particular metal salt employed, etc. This process generally will not be as highly regarded as the one first described since it involves an additional dipping, brushing or cascading of material onto the product and because not all the coating will necessarily be a gelatinate.

After the metal gelatinate coating has been applied to the foodstuff, the coated food may be encased in a water and/or water vapor impermeable film. For example, a sheet of polyvinylidene chloride plastic (commonly sold under the trademark Saran) or rubber hydrochloride (sold under the trademark Pliofilm) may be wrapped and sealed about the coated food. The coated food may be placed in a bag formed of one of the same films with the bag subsequently being sealed, with or without first vacuumizing the bag. Another procedure would be to dip the coated food into another film forming material to provide a water and/or water vapor barrier film about the metal gelatinate coating. One dip for this purpose might be a 20% solution of a copolymer of 80% vinylidene chloride and 15% acrylonitrile (or the product marketed commercially as Saran F-120) in methyl ethyl ketone. A "Saran" base dip is marketed under the trademark Viskote which is suitable for applying a water impermeable film over the gelatinate coating. Usually these "Saran" base dips require special surface preparations in order to obtain a good film, but this is not necessary after having first applied the metal gelatinate coating. They can not be used over fresh meats because of the water and fat present, but after sealing the fresh meat in the metal gelatinate a "Saran" base dip may be used.

*Example I*

Ten and six-tenths (10.6) pounds of 275 Bloom gelatin was mixed into 46.6 pounds of cold water and the lot heated in a water bath at about 180° F. until the solution reached 142° F. After skimming the foam from the solution, 2.12 pounds of aluminum sulfate (N.F. grade) dissolved in 4.24 pounds of hot water was stirred into the gelatin solution. Before using the resultant product as a dip it was cooled to about 118-120° F. Salami sausages, both the Genoa type and the B.C. type, were hung on hooks and dipped in the resultant product, the aluminum gelatinate. After dipping, the aluminum gelatinate coating hardened by air drying at room temperature in a matter of seconds.

A dip similar to that described above has been successfully used to coat oleomargarine, shortening, cheese, slices of fresh and frozen beef, various sausages, e.g. cervelat, salami, etc., Canadian bacon and boned, rolled hams. The coating obtained is entirely free from grease and will remain that way even when not under refrigeration. It is substantially colorless and transparent.

Foodstuffs coated with aluminum gelatinate as just described have been dipped a second time in a "Saran" base dip, previously described. The two coats have been applied in rapid sequence and without any special preparations before or between the coatings thus establishing the commercial practicality of the process and coatings. Upon holding dry sausage items so coated, no salt rust or mold developed. The loss in weight during the holding period was relatively small. Product so coated has a clear glazed appearance. The covering is tight about the product with no wrinkles, etc. therein.

To produce the aluminum gelatinate I prefer to use aluminum sulfate as the salt since it is relatively cheap and is easy to handle. However, other acid salts such as aluminum chloride could be employed. The salt should be relatively pure, at least N.F. grade, since impurities may result in a coloring of the coating and a lack of transparency. In applications where these factors are not a problem a less pure grade of salt could be employed.

*Example II*

The quantities and procedures of Example I were used except that zinc sulfate was substituted for the aluminum sulfate to produce a zinc gelatinate solution. Meats were dipped into the zinc gelatinate solution with the gelatinate coating quickly drying in air to a clear transparent covering having a slight amber cast.

Upon reacting the acid salts of some of the heavy metals, e.g. iron and chromium, with a gelatin solution it will be found that the resultant gelatinate hardens to an extent as to be unsuitable for use as a dip to obtain a coating. In this case particularly the second procedure for obtaining the gelatinate coating may be employed.

*Example III*

A water solution of 275 Bloom gelatin was made of which 18.5% by weight was gelatin and 81.5% was water. A 180° F. water bath was used to heat the solution until all the gelatin was dissolved. After skimming the foam, the solution was cooled to about 115° F. and salami sausage was dipped therein. Upon removal from the solution the coating was air dried for 15 minutes and the sausage was then dipped in a solution of iron chloride (33.3% iron chloride and 66.7% water, by weight) the temperature of which was 115° F. The resultant coating had a non-tacky surface and was impervious to oil or grease. It had a greenish color and was transparent.

The foregoing detailed description is only for clearness of understanding and for the purpose of complying with 35 U.S.C. 112 and I do not desire to be limited to the exact details described for obvious modifications will occur to persons skilled in the art.

I claim:

1. The method of manufacturing a coating material for food products comprising the step of reacting gelatin in a water solution with the acid salt of a metal selected from the group consisting of aluminum and non-toxic heavy metals.

2. The method of manufacturing a coating material for food products comprising the step of reacting gelatin in a water solution with an aluminum acid salt.

3. The method of manufacturing a coating material for food products comprising the step of reacting gelatin in a water solution with a zinc acid salt.

4. The method of manufacturing a coated food product comprising applying a liquid gelatinate of a metal selected from the group consisting of aluminum and non-toxic heavy metals to said food and drying the same.

5. The method of manufacturing a coated food product comprising applying a solution of about 5% to about 30% by weight of aluminum gelatinate to said food and drying said aluminum gelatinate.

6. The method of manufacturing a coated food product comprising applying a solution of about 5% to about 30% by weight of zinc gelatinate to said food and drying said zinc gelatinate.

7. The method of manufacturing a coated food product comprising applying a solution of gelatin to said product to form a gelatin coating and contacting said coating with the acid salt of a metal selected from the group consisting of aluminum and non-toxic heavy metals.

8. The method of manufacturing a coated food product comprising dipping said food product into a gelatin solution to form a gelatin coating thereon and thereafter applying a solution of an acid salt of a metal selected from the group consisting of aluminum and non-toxic heavy metals to said coating to convert at least the surface of said coating to a gelatinate of said metal.

9. The method of manufacturing a coated food product comprising applying a solution of gelatin to said product to form a gelatin coating and contacting said coating with an iron acid salt.

10. The method of manufacturing a coated food product comprising applying a solution of gelatin to said product to form a gelatin coating and contacting said coating with a chromium acid salt.

11. The method of manufacturing a coated food product comprising dipping said food product into a gelatin solution to form a gelatin coating thereon and thereafter applying a solution of an iron acid salt to said coating to convert at least the surface of said coating to an iron gelatinate.

12. The method of manufacturing a coated food product comprising dipping said food product into a gelatin solution to form a gelatin coating thereon and thereafter applying a solution of a chromium acid salt to said coating to convert at least the surface of said coating to a chromium gelatinate.

13. A coating for food products comprising a liquid gelatinate of a metal selected from the group consisting of aluminum and non-toxic heavy metals.

14. A coating for food products comprising about 5% to about 30% by weight of a gelatinate of a metal selected from the group consisting of aluminum and non-toxic heavy metals in water.

15. A coating for food products comprising a solution of about 5% to about 30% aluminum gelatinate.

16. A coating for food products comprising a solution of about 5% to about 30% zinc gelatinate.

17. A coating for food products comprising an iron gelatinate solution.

18. A coating for food products comprising a zinc gelatinate solution.

19. A coating for food products comprising an aluminum gelatinate solution.

20. A coating for food products comprising a chromium gelatinate solution.

References Cited in the file of this patent

UNITED STATES PATENTS

| | | |
|---|---|---|
| 1,128,059 | Schoop | Feb. 9, 1915 |
| 1,914,351 | Hall et al. | June 13, 1933 |
| 2,245,576 | Dickinson et al. | June 17, 1941 |
| 2,337,645 | Cadwell | Dec. 28, 1943 |
| 2,352,611 | Bowers | July 4, 1944 |
| 2,401,919 | Ender | June 11, 1946 |
| 2,428,495 | Lesparre et al. | Oct. 7, 1947 |
| 2,567,085 | Stoloff | Sept. 4, 1951 |

OTHER REFERENCES

"The Fundamentals of College Chemistry," 1954, second edition by G. B. King, published by American Book Co., New York, pages 475 and 476.